(12) United States Patent
Mercure (10) Patent No.: US 7,217,077 B2
(45) Date of Patent: May 15, 2007

(54) STORAGE SYSTEM FOR GLASS OFFCUTS

(75) Inventor: Roger Mercure, Mascouche (CA)

(73) Assignee: Bromer Inc., Terrebonne, Quebec (CA)

( * ) Notice: Subject to any disclaimer, the term of this patent is extended or adjusted under 35 U.S.C. 154(b) by 413 days.

(21) Appl. No.: 10/798,326

(22) Filed: Mar. 12, 2004

(65) Prior Publication Data

US 2004/0228708 A1 Nov. 18, 2004

(30) Foreign Application Priority Data

Mar. 13, 2003 (CA) .................................. 2421121

(51) Int. Cl.
*B65G 47/84* (2006.01)

(52) U.S. Cl. ...................... 414/398; 209/542

(58) Field of Classification Search ................ 414/398, 414/466, 801, 921; 209/542
See application file for complete search history.

(56) References Cited

U.S. PATENT DOCUMENTS

| | | | | |
|---|---|---|---|---|
| 2,865,513 A | * | 12/1958 | Allen | 211/41.14 |
| 2,884,136 A | * | 4/1959 | Leighton | 211/41.14 |
| 2,902,168 A | * | 9/1959 | Allen, Jr. | 211/41.14 |
| 3,279,664 A | * | 10/1966 | Lynch | 225/96.5 |
| 3,589,525 A | * | 6/1971 | Allen | 211/162 |
| 4,109,805 A | | 8/1978 | Wagner | |
| 4,135,655 A | | 1/1979 | Brown | |
| 4,750,854 A | | 6/1988 | Pascale et al. | |
| 4,815,395 A | * | 3/1989 | Trueg | 108/187 |
| 5,024,576 A | | 6/1991 | Meschi | |
| 5,209,627 A | * | 5/1993 | Lisec | 414/398 |
| 5,375,959 A | | 12/1994 | Trento | |
| 5,505,574 A | | 4/1996 | Piazza | |
| 5,511,671 A | * | 4/1996 | Zumstein | 209/542 |
| 5,641,076 A | | 6/1996 | Englund | |
| 5,542,805 A | | 8/1996 | Lisec | |
| 5,906,282 A | | 5/1999 | Aldrich et al. | |
| 6,247,601 B1 | | 6/2001 | Norton et al. | |
| 6,382,897 B2 | | 5/2002 | Mattio et al. | |
| 6,510,950 B1 | | 1/2003 | Piazza | |
| 6,659,265 B2 | * | 12/2003 | Pfeilschifter et al. | 198/468.6 |
| 7,025,053 B1 | * | 4/2006 | Altamirano | 125/13.01 |
| 2002/0005332 A1 | | 1/2002 | Piazza | |
| 2005/0103055 A1 | | 5/2005 | Gfeller et al. | |
| 2005/0276680 A1 | * | 12/2005 | Chen et al. | 414/744.1 |

FOREIGN PATENT DOCUMENTS

| | | |
|---|---|---|
| DE | 3934967 | 4/1991 |
| DE | 19636470 | 3/1998 |
| DE | 19821677 | 11/1999 |
| EP | 0032866 | 7/1981 |
| EP | 0048334 | 3/1982 |
| EP | 0673890 | 9/1995 |
| EP | 0749916 | 12/1996 |
| EP | 0993316 | 8/1999 |
| EP | 1284229 | 2/2002 |
| EP | 1323651 | 7/2003 |
| WO | WO97/45341 | 12/1997 |

* cited by examiner

*Primary Examiner*—Charles A Fox
(74) *Attorney, Agent, or Firm*—Ogilvy Renault LLP

(57) ABSTRACT

The storage system is for use next to a glass processing line having a loading table, a glass cutting table and a breakout table. The storage system comprises a first tilt table and a second tilt table. A storage rack is positioned between the first and the second tilt table. The storage rack comprises a plurality of parallel storage slots extending longitudinally within the main frame of the storage rack. The storage slots storing the glass offcuts at a substantially vertical position of less than 90 degrees with reference to the horizontal. In use, the first tilt table receives horizontally-disposed glass offcuts from the breakout table and sends it to the storage rack. The second tilt table receives previously-stored glass offcuts from the storage rack to be directed to the loading table. A method of storing a glass offcut and a method of recycling glass offcuts are also disclosed. The storage system and methods allow to easily store and retrieve glass offcuts.

9 Claims, 11 Drawing Sheets

STORAGE SYSTEM FOR GLASS OFFCUTS

BACKGROUND

Flat glass parts included in items such as windows, curtain walls, mirrors or any similar articles are almost always cut from large glass panes. A typical dimension for these large glass panes is 96 inches by 144 inches, other dimensions being also used as well. The smaller glass sections are cut from the large glass panes according to calculated patterns in order to obtain a maximum use thereof. A computer is used for optimizing the cutting patterns. The goal is usually to reach an efficiency ratio of at least 92% of the surface area of each original glass pane. With such yield, the glass offcuts are usually too small to be useful and are simply sent to a bin for glass material recycling.

There is a very wide range of different glass panes on the market to fulfill the needs of customers. Glass panes can have different thicknesses, colors, resistances, hard and soft coatings, etc. Some production lines are thus supplied with different types of glass panes every day to process various orders from their customers. This situation is usually that of commercial window manufacturers. For instance, when manufacturing windows for a new building, a number of glass sections will have to be cut from several large glass panes. However, once the order is completed, the last one of the large glass panes is often used only partially, thus less than the usual 92% efficiency ratio goal. Another section of this specific glass offcut may not be required again for several weeks or even months.

When the glass offcut is relatively small, for instance 36 inches by 48 inches, two workers can remove it from the production line and store it on a rack until it is needed again. However, in the case of a large glass offcut, such as a section being 36 inches by 72 inches, the handling by hand is generally considered too dangerous to be undertaken. This is why these large offcuts are currently cut into smaller parts to ease their manipulation by hand. The drawback of these smaller parts is that they will be useless if they are smaller than what is needed. Yet, even if someone is able to remove large glass offcuts from a production line, inadequate manipulation and storage may destroy their value. For instance, many glass panes have a soft coating on one side. This soft coating will eventually be located inside a window or a mirror once the glass item is assembled. Meanwhile, the exposed surface is very sensitive to scratches or dust. Storing glass offcuts one against another or horizontally may damage the soft coating. Also, it may be difficult to maintain a constant inventory of sections still available.

For all these reasons, it is usually simpler for operators to throw all glass offcuts in a recycle bin and send the bin offsite for material recycling. This of course decreases the yield and thus the profits. For customers, it increases the costs and delay for replacing one window in the future. If a customer wants to replace a window with a particular kind of glass, a new large glass pane will need to be ordered and manufactured in accordance to the specifications, shipped to the processing plant and then cut. Its offcut will be destroyed thereafter.

There is clearly a need for an improved storage system for glass offcuts and a new method for storing glass offcuts. There is also a need for a method of recycling glass offcuts, namely being able to reuse them at a later time.

SUMMARY

In accordance with an aspect of the present invention, there is provided storage system for glass offcuts, the storage system being provided for use next to a glass processing line having a loading table, a glass cutting table and a breakout table, the storage system comprising:
a first tilt table comprising:
  a main frame;
  a movable frame pivotally connected to the main frame of the first tilt table, the movable frame being movable between a horizontal position and a substantially vertical position of less than 90 degrees with reference to the horizontal;
  a glass supporting assembly located on an upper side of movable frame of the first tilt table;
  a tilt mechanism connected between the main frame and the movable frame of the first tilt table;
  a conveyor unit mounted on the movable frame of the first tilt table, the conveyor unit being configured and disposed to move the glass offcuts when the movable frame of the first tilt table is at the substantially vertical position;
a second tilt table comprising:
  a main frame;
  a movable frame pivotally connected to the main frame of the second tilt table, the movable frame of the second tilt table being movable between a horizontally position and a substantially vertical position of less than 90 degrees with reference to the horizontal;
  a glass supporting assembly located on an upper side of movable frame of the second tilt table;
  a tilt mechanism connected between the main frame and the movable frame of the second tilt table;
  a conveyor unit connected to the movable frame of the second tilt table, the conveyor unit of the second tilt table being configured and disposed to move the glass offcuts when the movable frame of the second tilt table is at the substantially vertical position;
a storage rack positioned between the first tilt table and the second tilt table, the storage rack comprising:
  a main frame;
  a plurality of slot dividers defining a plurality of parallel storage slots extending longitudinally within the main frame of the storage rack, the storage slots individually storing the glass offcuts at a substantially vertical position of less than 90 degrees with reference to the horizontal;
  a conveyor unit located under the main frame, the conveyor unit being configured and disposed to move the glass offcuts in and out of the storage rack; and
  a carriage unit located under the main frame, the carriage unit being configured and disposed to transversally displace the main frame of the storage rack with reference to the first and second tilt tables; and
means for controlling operations of the first tilt table, the storage rack and the second tilt table;
whereby, in use, the first tilt table receives a glass offcut from the breakout table and sends it to the storage rack, and whereby, in use, the second tilt table receives a previbusly-stored glass offcut from the storage rack to be directed to the loading table.

In accordance with another aspect of the present invention, there is provided a method of storing a glass offcut next to a glass processing line, the method comprising:

receiving the glass offcut from a breakout table;

pivoting the glass offcut from a horizontal position to a substantially vertical position of less than 90 degrees with reference to the horizontal;

longitudinally conveying the glass offcut, at a substantially vertical position of less than 90 degrees with reference to the horizontal, to an individual storage location; and storing the glass offcut in a substantially vertical position of less than 90 degrees with reference to the horizontal.

In accordance with a further aspect of the present invention, there is provided method of recycling glass offcuts, the method comprising:

receiving an individual glass offcut from a breakout table;

pivoting the glass offcut from a horizontal position to a substantially vertical position of less than 90 degrees with reference to the horizontal;

longitudinally conveying the glass offcut, at a substantially vertical position of less than 90 degrees with reference to the horizontal, to an individual storage location;

storing the glass offcut in a substantially vertical position of less than 90 degrees with reference to the horizontal;

upon determining that the glass offcut is required, longitudinally conveying the glass offcut, at a substantially vertical position of less than 90 degrees with reference to the horizontal, out of the individual storage location;

pivoting the glass offcut from a substantially vertical position of less than 90 degrees with reference to the horizontal, to a horizontal position; and conveying the glass offcut to a loading table.

The details of these and also other aspects of the present invention are provided in the following detailed description, which is made with reference to the accompanying figures that are briefly described hereafter.

DETAILED DESCRIPTION

A storage system (10) in accordance with a preferred embodiment is described hereinafter and illustrated in the appended figures. A method of storing one or more glass offcuts, and a method of recycling one or more glass offcuts are also disclosed. It must be noted that various changes and modifications may be effected therein without departing from the scope conferred by the appended claims.

Figure 1:
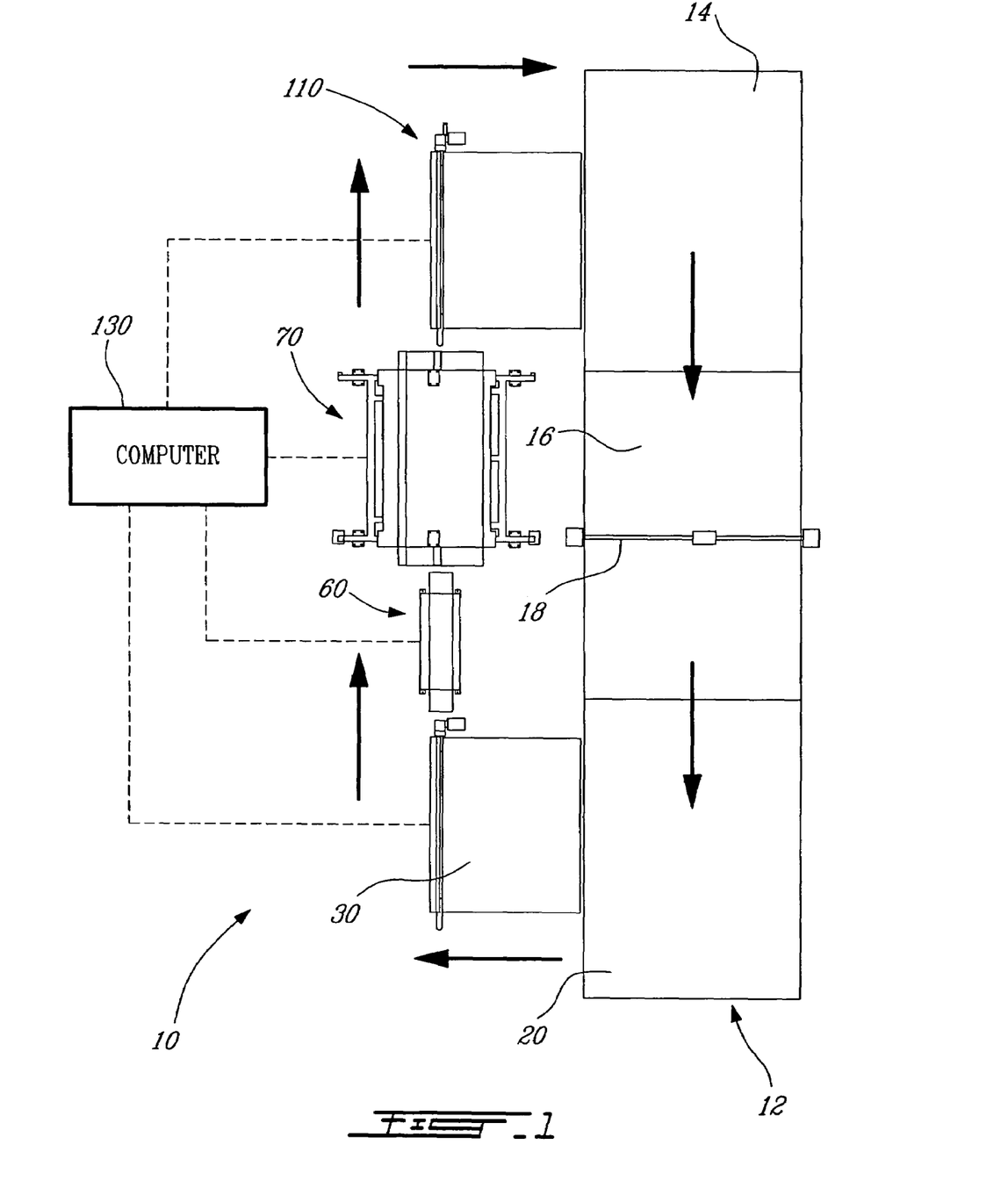
FIG. 1 is a schematic top plan view of a storage system located next to a flat glass processing line.

Referring first to FIG. 1, there is shown a typical flat glass processing line (12) on the side of which a storage system (10) is installed. The processing line (12) comprises a loading table (14) where horizontally disposed glass panes are provided, a glass cutting table (16), including a computer-controlled glass cutting tool (18), and a breakout table (20) located downstream the glass cutting table (16). The breakout table (20) is the location where glass sections cut from a large glass pane are detached to be sent elsewhere in the plan for further processing. The storage system (10) is used for the glass offcuts which are large enough to be eventually recycled back to the processing line. The illustrated arrows in FIG. 1 denote the normal possible direction of travel of glass panes and their cutoffs.

The storage system (10) comprises a first tilt table (30), an optional intermediary conveyor (60), a storage rack (70) and a second tilt table (90). The various motors and actuators of these parts are controlled by a computer (110) or using any other suitable kind of control means.

Figure 2:
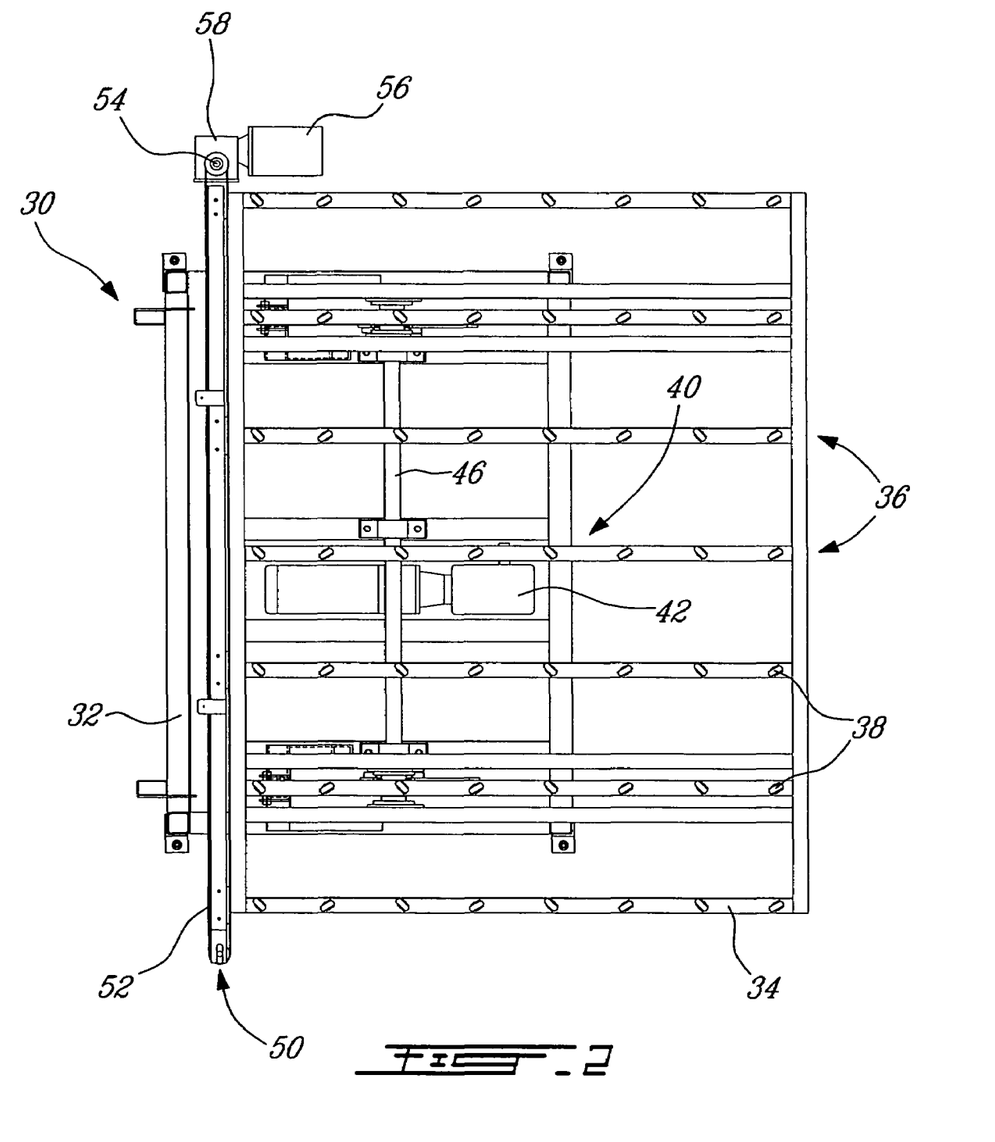
FIG. 2 is a top plan view of the first tilt table.
Figure 3:
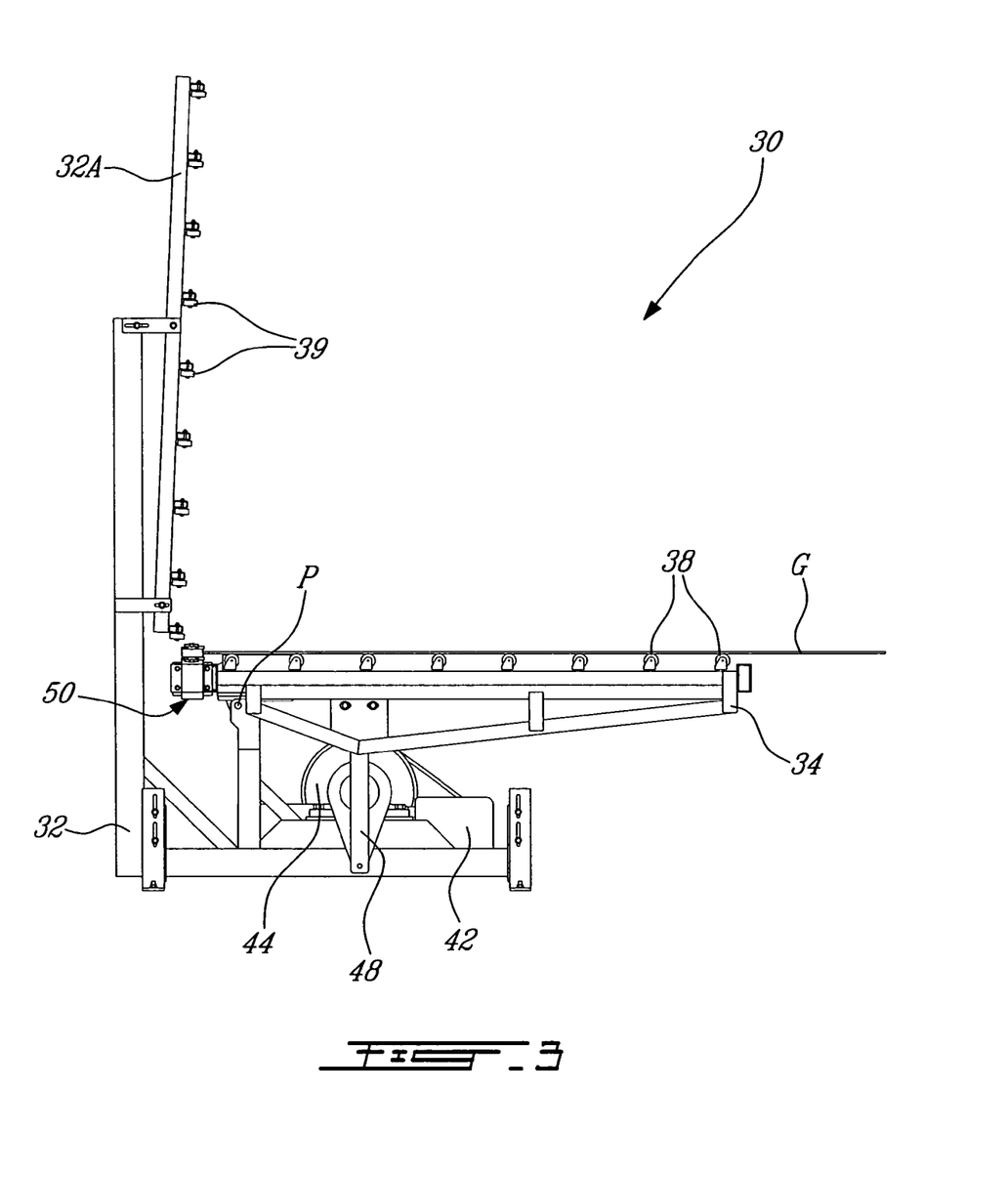
FIG. 3 is a side elevation view of the first tilt table, showing its movable frame in the horizontal position.
Figure 4:
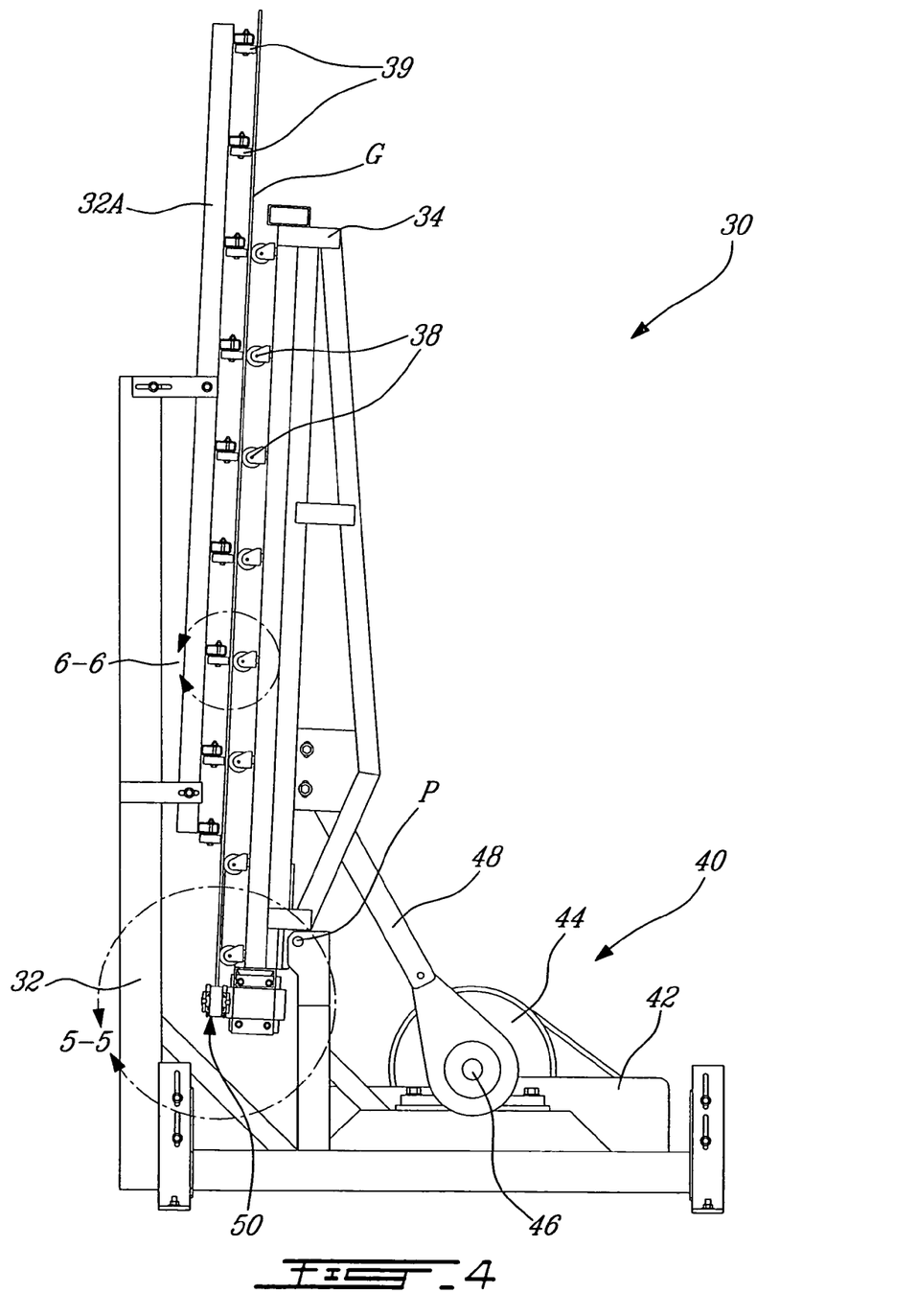
FIG. 4 is a view similar to FIG. 3, showing the movable frame in the substantially vertical position.

As shown in FIGS. 2 to 4, the first tilt table (30) comprises a main frame (32), secured to the floor, and a movable frame (34) pivotally connected to the main frame (32). The first tilt table (30) is configured and disposed so that it is possible to horizontally convey a glass offcut (G), usually pushed by hand, from the breakout table (20) to the upper part of its movable frame (34). The movable frame (34) comprises a glass supporting assembly (36) on an upper part thereof, namely the upper part when the movable frame (34) is horizontal. This assembly (36) can include a plurality of caster wheels (38) or an air cushion created using an appropriate hardware (not shown). Other techniques can also be used as well.

The movable frame (34) is movable around a pivot axis (P) between a horizontal position and a substantially vertical position of less than 90 degrees with reference to the horizontal. FIG. 3 shows the movable frame (34) in the horizontal position and FIG. 4 shows the movable frame (34) in the substantially vertical position. A tilt mechanism (40) is provided between the main frame (32) and a movable frame (34) of the first tilt table (30). It comprises a motor (42) connected to a pulley assembly (44), itself connected to a drive shaft (46) and to articulated levers (48).

A motor-driven conveyor unit (50) is mounted on the movable frame (34) of the first tilt table (30). When the movable frame (34) is horizontal, the conveyor unit (50) acts as a stop at the end of the movable frame (34). The conveyor unit (50) is configured and disposed to move the glass offcut (G) when the movable frame (34) is at a substantially vertical position, as shown in FIG. 4.

Figure 5:
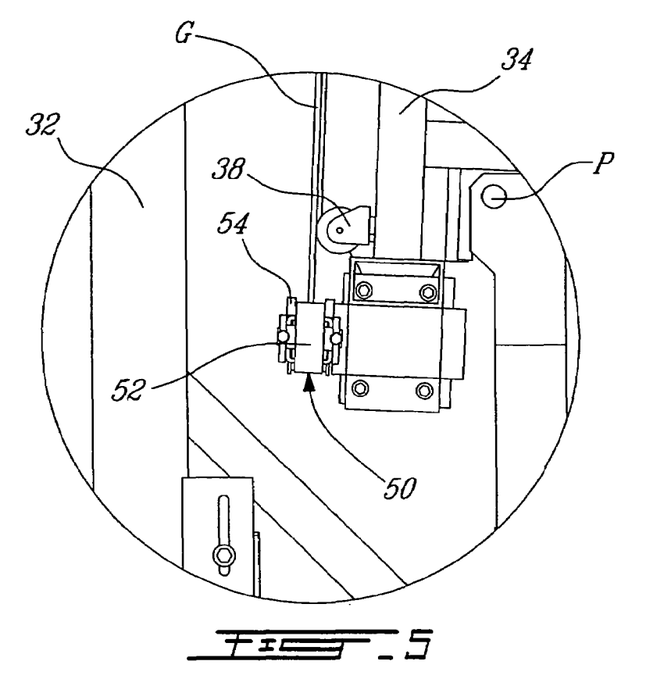
FIG. 5 is an enlarged side view of the bottom of a glass offcut in a vertical position and resting on the conveyor unit of the first tilt table.

As best shown in FIG. 5, the bottom of the glass offcut (G) rests on the conveyor unit (50) when oriented at this substantially vertical position. This conveyor unit (50) allows carrying the glass offcut (G) towards the storage location. The conveyor unit (50) comprises an endless belt (52), for instance made of polyurethane, supported by a set of pulleys (54) and driven by an electrical motor (56) connected to a gearbox (58), as shown in FIG. 2. The glass offcut (G) will be moved in its longitudinal direction. Other kinds of conveyor units (50) can be used as well.

Figure 6:
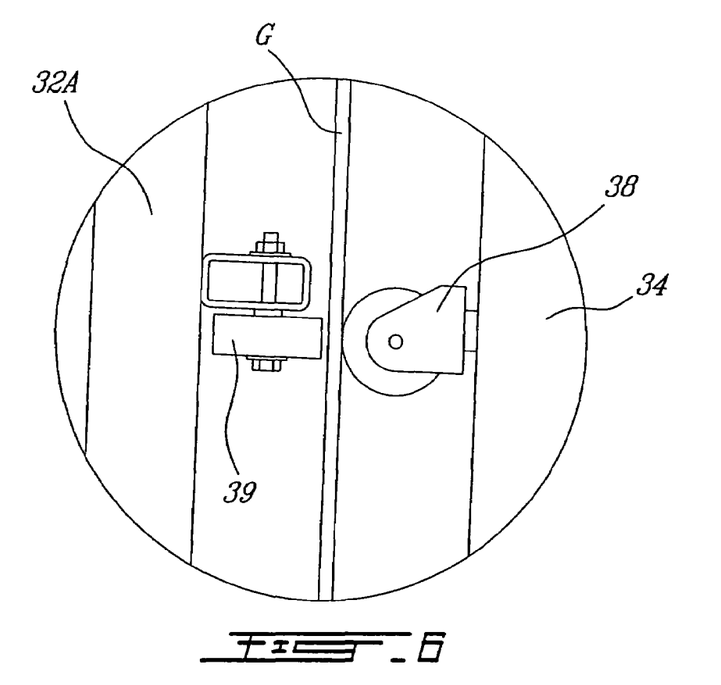
FIG. 6 is an enlarged side view of a glass offcut at the substantially vertical position.

FIG. 6 shows that the glass offcut (G) does not contact rollers (39) located on a vertically extending portion (32A) of the main frame (32) of the first tilt table (30). This vertically extending portion (32A) and its rollers (39) are only provided in case something moves the glass offcut (G) out of engagement of the movable frame (34), such as if a wind gust enters the building. One advantage of having only one main face of the glass offcut (G) touching the storage system (10) is that the other side will not be damaged by any part of the storage system (10) since it will always remain out of engagement with something.

Figure 7:
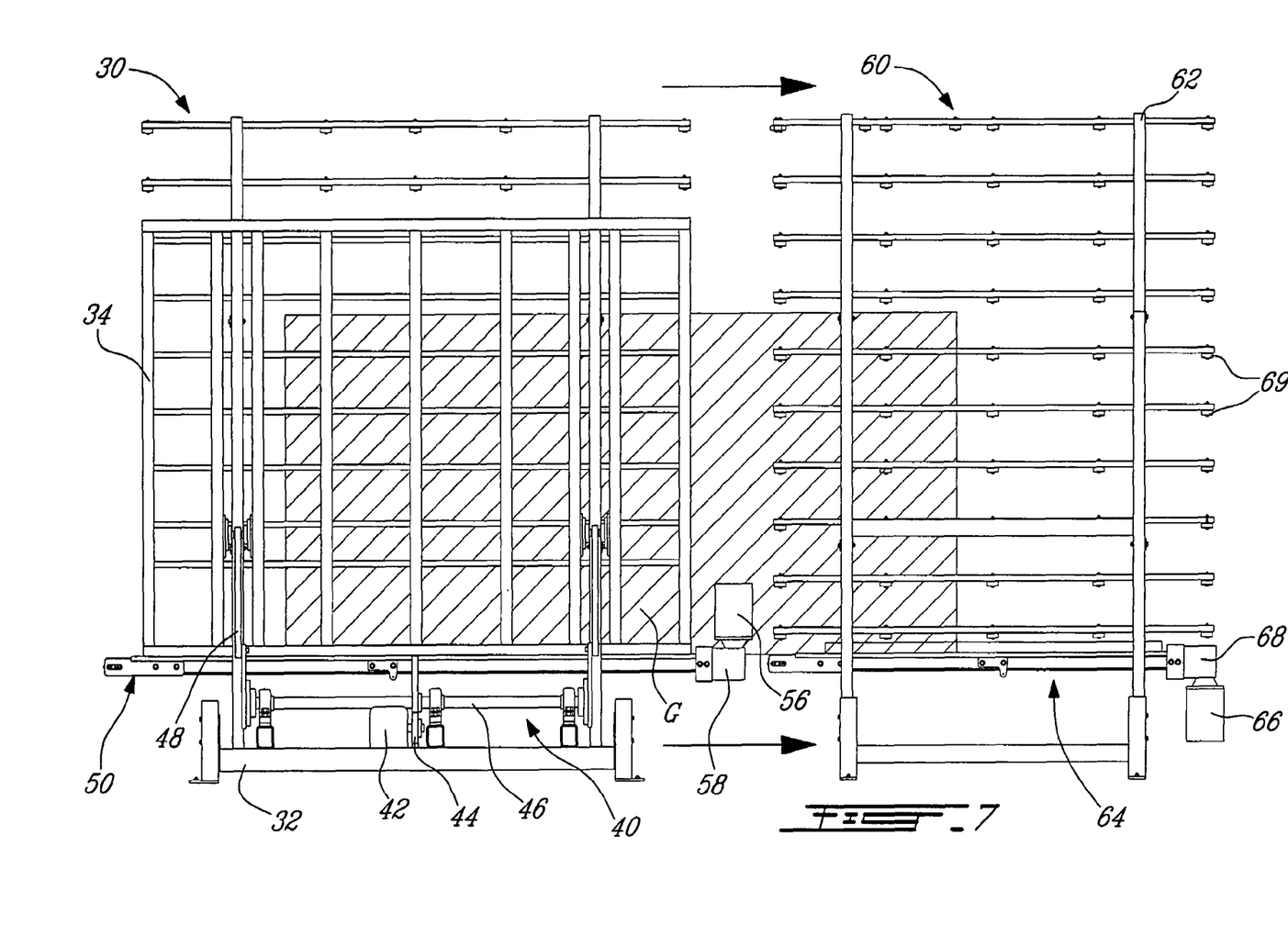
FIG. 7 is a front view illustrating the transition of a glass offcut from the first tilt table to an optional intermediary conveyor.

FIG. 7 shows the transition of the glass offcut (G) from the first tilt table (30) to an optional intermediary conveyor (60). This intermediary conveyor (60) is present if the overall length of the loading table (14), glass cutting table (16) and breakout table (20) is longer than the overall length of the basic storage system (10). This intermediary conveyor (60) comprises a double-sided main frame (62) with a belt-type conveyor unit (64) driven by a motor (66) connected to a gearbox (68). One side of the main frame (62) is oriented in accordance with a substantially vertical position of less than 90 degrees with reference to the horizontal. Rollers (69) are used to laterally support the glass offcut.

The storage rack (70) and parts thereof are individually illustrated in FIGS. 8 to 12. In the illustrated embodiment, the storage rack (70) is also downstream the intermediary conveyor (60). The storage rack (70) is the location where the glass offcuts (G) will be stored until they are needed. The storage rack (70) comprises a main frame (72) made of a plurality of horizontal and vertical beams (74,76).

Figure 8:
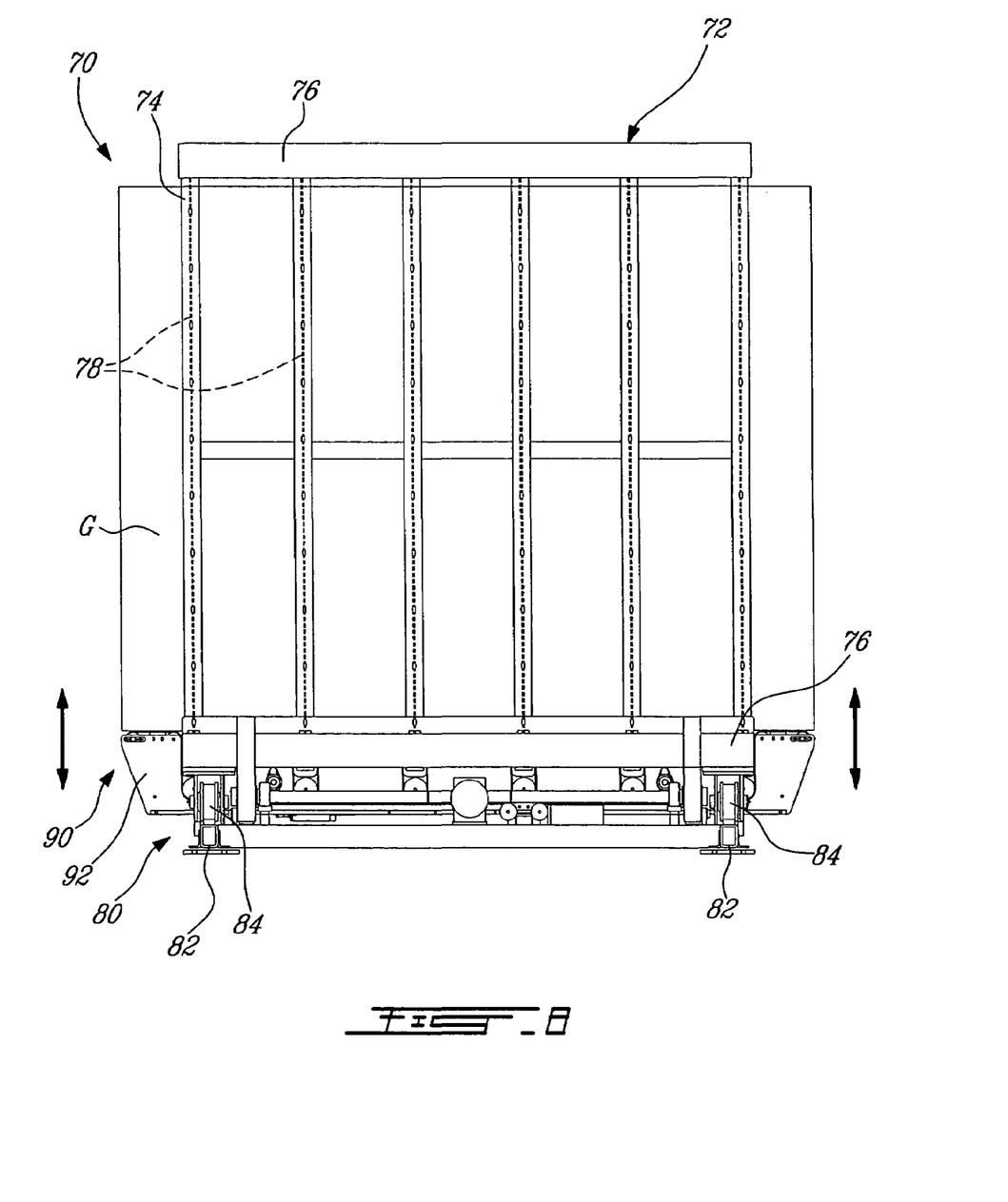
FIG. 8 is a front view of the storage rack.
Figure 9:
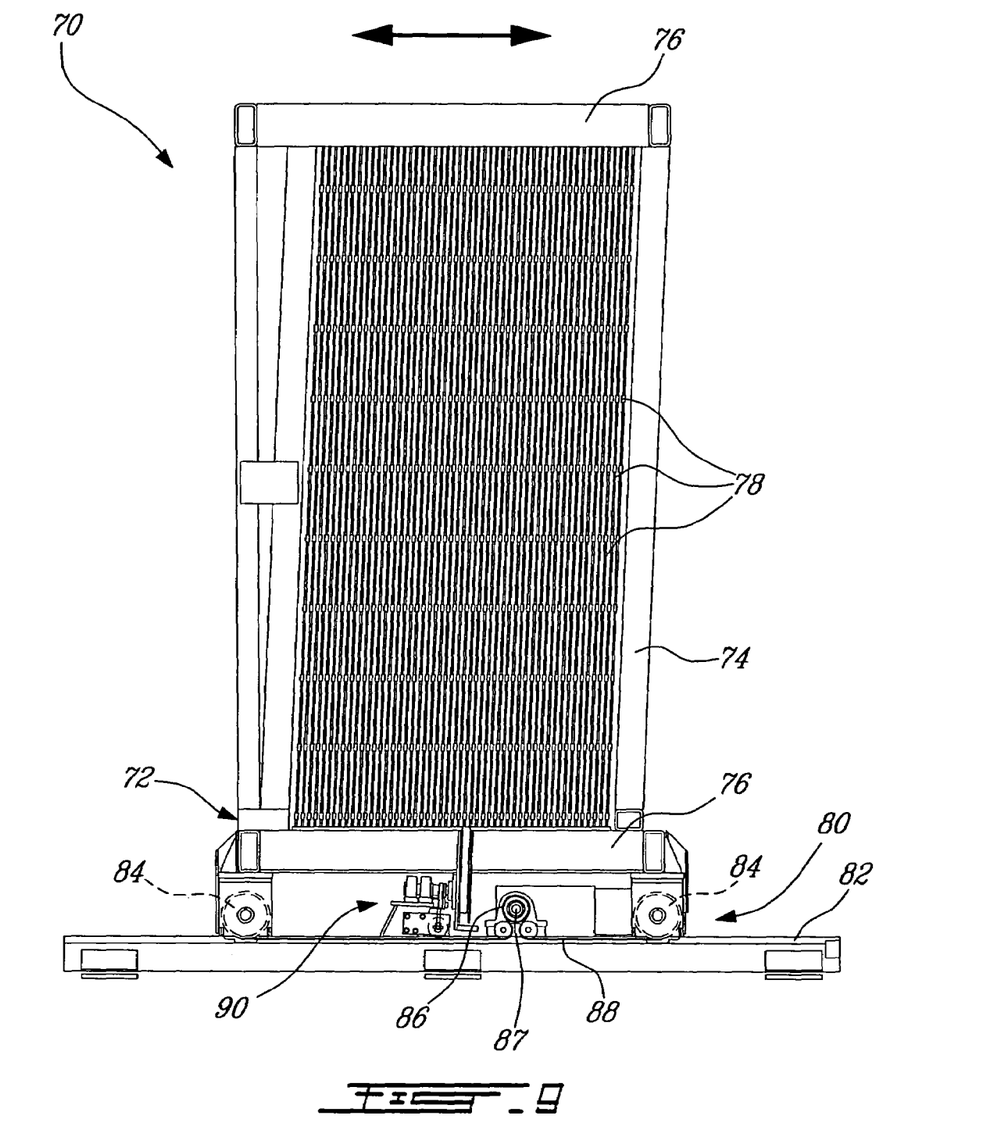
FIG. 9 is a side view of the storage rack shown in FIG. 8.

Within these beams (74,76) are located a plurality of parallel storage slot dividers (78) which are configured and disposed to provide a plurality of slots extending longitudinally within the main frame (72) of the storage rack (70). These storage slots are used to individually storing glass offcuts (G) in a substantially vertical position of less than 90 degrees with reference to the horizontal. The glass offcuts (G) will be individually stored therein, namely that their main faces will not touch another glass offcut. These storage slot dividers (78) are in the form of a plurality of relatively thin wires or rods provided with small rollers, the rods being disposed in rows extending from the top of the main frame (72) to its bottom.

The storage rack (70) is mounted on a carriage unit (80) configured and disposed to transversally displace the main frame (72) of the storage rack (70) with reference to a travel axis defined by the first tilt table (30). This carriage unit (80) comprises two or more parallel rails (82), secured on the floor, and a plurality of wheels (84) used for supporting the main frame (72). An actuator, linear or rotational, is used to move the main frame (72) with reference to the rails (82). The illustrated embodiment uses, on both sides, a rotational actuator (84) having a driven-pulley (87) in mesh with a belt (88) wound around the wheels (84). This design provides a very compact arrangement. Other arrangements are also possible. Moving the storage rack (70) allows to align any of the storage slots with the glass offcut (G) coming out of the first tilt table (30) and possibly the intermediary conveyor (60).

Figure 10:
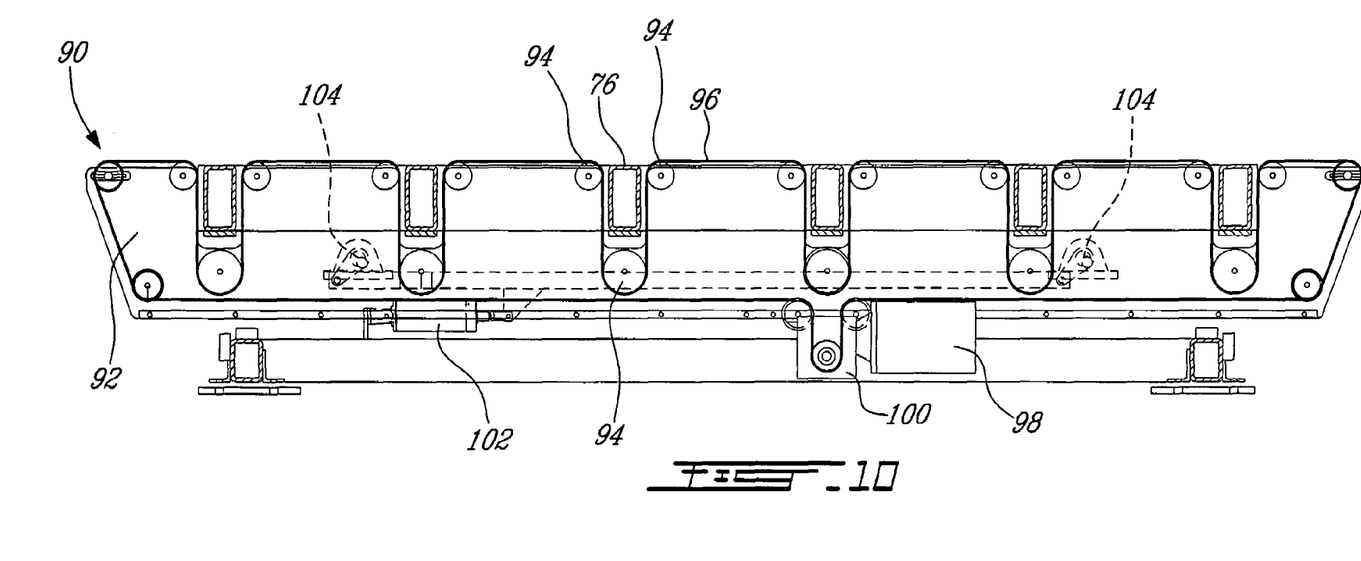
FIG. 10 is an enlarged front view of the conveyor unit of the storage rack.
Figure 11:
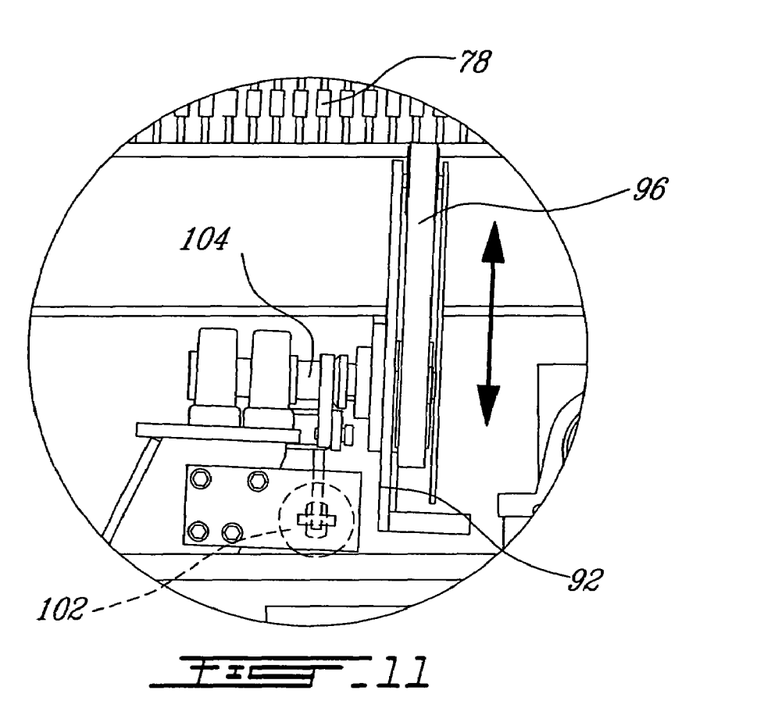
FIG. 11 is an enlarged side view of the conveyor unit of the storage rack.

The storage rack (70) comprises a conveyor unit (90) configured and disposed to move the glass offcuts (G) in and out of the storage rack (70). The conveyor unit (90) does not move sideward with the main frame (72). It always remain aligned with the path of the glass offcuts (G). Glass offcuts (G) enter the storage slots from one side and will exit the storage slots from an opposite side. This conveyor unit (90) comprises a vertically-movable conveyor frame (92) extending parallel with reference to the storage slots and located under the main frame (72) of the storage rack (70). As shown in FIGS. 10 and 11, a plurality of pulleys (94) is mounted on the conveyor frame (92) to support a conveyor belt (96). A motor (98) is mechanically connected to the conveyor belt (96) through a gearbox (100). A pneumatic actuator (100) is configured and disposed to selectively move the conveyor frame (92) between a raised position and a lower position. Activating the actuator (102) forces the conveyor frame (92) to pivot around a set of pivots (104), eventually causing the frame (92) to move upward in the last portion of the stroke.

In the illustrated embodiment, the pulleys (94) of the conveyor unit (90) are configured and disposed to shape the conveyor belt (96) in a zigzag pattern. This allows the upper portion of the conveyor belt (96) to be raised between lower beam members of the main frame (72) of the storage rack (70).

Figure 12:
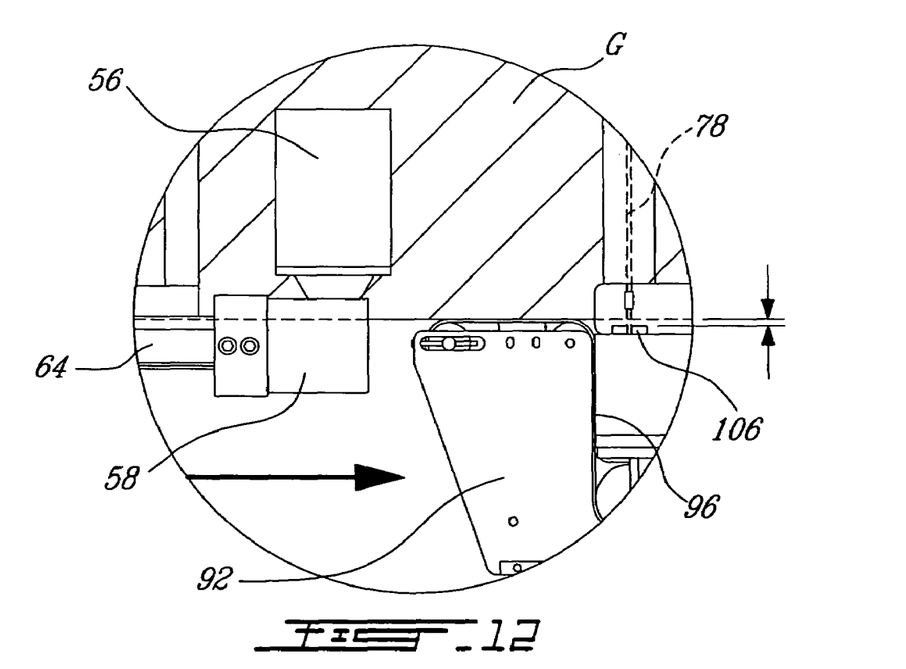
FIG. 12 is an enlarged front view showing the transition of a glass offcut between the intermediary conveyor and the storage rack.

FIG. 12 shows that each storage slot has a bottom supporting area being slightly lower than the upper portion of the conveyor unit (64) of the intermediary conveyor (60). This allows conveying the glass offcut (G) at the same level from the first tilt table (30) to the storage rack (70). Then, when the conveyor unit (90) of the storage rack (70) is lowered, the bottom of the glass offcut (G) will rest on the bottom supporting beams (76). They are preferably provided with protector members (106), for instance rubber or foam pieces, to avoid damaging the bottom of the glass offcut (G).

Figure 13:
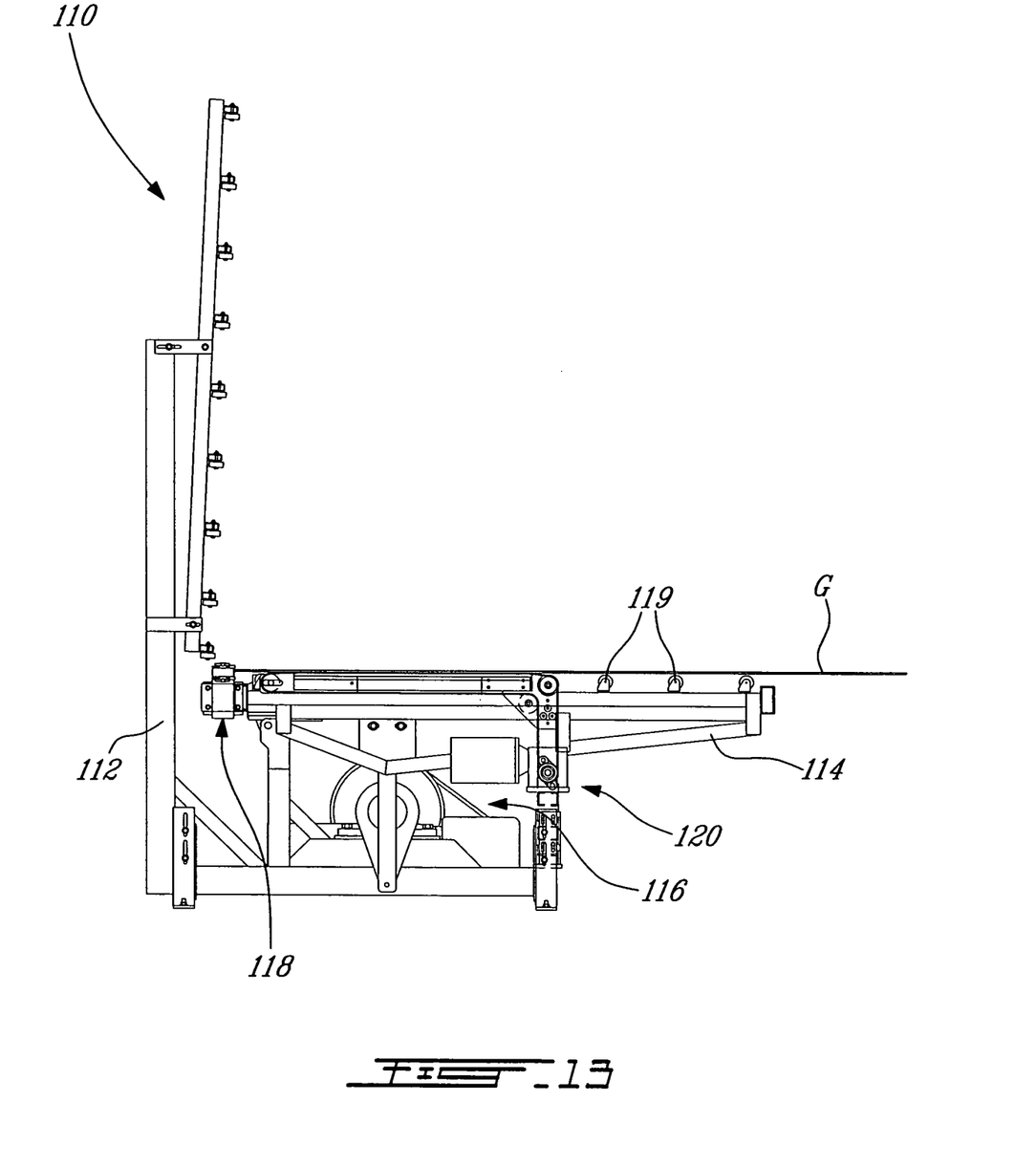
FIG. 13 is a side view of the second tilt table, showing its movable frame in the horizontal position.

The storage system (10) further comprises a second tilt table (110) located at the exit side of the storage rack (70). The second tilt table (110) is somewhat similar to the first tilt table (30), as shown in FIG. 13. It comprises a main frame (112) and a movable frame (114), the movable frame (114) being movable around a pivot axis (P) between a substantially vertical position of less than 90 degrees with reference to the horizontal, and the horizontal. It comprises a glass supporting assembly, using for instance caster wheels (119). A tilt mechanism (116) allows moving the movable frame (114) with reference to the main frame (112). A conveyor unit (118) is connected to the movable frame (114). This conveyor unit (118) of the second tilt table (110) is configured and disposed to move the glass offcuts (G), when the movable frame (114) of the second tilt table (110) is at the substantially vertical position.

The substantially vertical positions referred to earlier can be defined as angle between 85° and 88° with reference to the horizontal. This range of angles has been found to avoid the upper main face of a horizontally-disposed glass offcut (G) to make contact with any part of the storage system (10) when tilted near the vertical and conveyed through it. The angle can be slightly different or be identical between the first tilt table (30), the intermediary conveyor (60), the storage slot dividers (68) and the second tilt table (110). In practice, the angle should be the same throughout the system (10).

In the illustrated embodiment, the second tilt table (110) comprises at least two transversal horizontal belt conveyors (120) configured and disposed to support a glass offcut (G) above the movable frame (114) thereof, when positioned at the horizontal position, and convey the glass offcut (G) transversally to the loading table (14). When the movable frame (114) is horizontal, the glass offset (G) does not contact the caster wheels (119) anymore.

A computer (130) is used to control the sequence of operations. The computer (130) includes connections to relays of the various motors and actuators. It also comprises a database to record information on each glass offcut (G) stored therein. This section of the computer (130) may be interfaced with a section controlling the supply of large glass panes. If it detects that one stored glass offcut (G) is identical to that of a large glass pane being required, it can send a signal to that effect and eventually instruct the storage system (10) to send the glass offcut back to the loading table (14) of processing line (12).

In use, the storage system (10) is able to undertake a new method of storing a glass offcut next to a glass processing line. In accordance with this method, the glass offcut is received from a breakout table. The glass offcut is then pivoted from a horizontal position to a substantially vertical position of less than 90 degrees with reference to the horizontal. From there, it is longitudinally conveyed, at a substantially vertical position of less than 90 degrees with reference to the horizontal, to an individual storage location. The glass offcut is finally stored in a substantially vertical position of less than 90 degrees with reference to the horizontal.

Later, upon determining that one glass offcut is required from its storage location, the glass offcut is longitudinally conveyed, still at a substantially vertical position of less than 90 degrees with reference to the horizontal, out of the individual storage location. It is then pivoted from a substantially vertical position of less than 90 degrees with reference to the horizontal, to a horizontal position. Finally, it is conveyed to a loading table.

A new method of recycling glass offcuts is also provided. In accordance with this method, an individual glass offcut is first received from a breakout table. It is pivoted from a horizontal position to a substantially vertical position of less than 90 degrees with reference to the horizontal. Then, it is longitudinally conveyed, still at a substantially vertical position of less than 90 degrees with reference to the horizontal, to an individual storage location. The glass offcut is stored in a substantially vertical position of less than 90 degrees with reference to the horizontal. Upon determining that the glass offcut is required, the glass offcut can be longitudinally conveyed, at a substantially vertical position of less than 90 degrees with reference to the horizontal, out of the individual storage location. It is pivoted from its substantially vertical position to a horizontal position. Finally, it is conveyed to a loading table.

What is claimed is:

1. A storage system for glass offcuts, the storage system being provided for use next to a glass processing line having a loading table, a glass cutting table and a breakout table, the storage system comprising:
    a first tilt table comprising:
        a main frame;
        a movable frame pivotally connected to the main frame of the first tilt table, the movable frame being movable between a horizontal position and a substantially vertical position of less than 90 degrees with reference to the horizontal;
        a glass supporting assembly located on an upper side of movable frame of the first tilt table;
        a tilt mechanism connected between the main frame and the movable frame of the first tilt table;
        a conveyor unit mounted on the movable frame of the first tilt table, the conveyor unit being configured and disposed to move a selected glass offcut when the movable frame of the first tilt table is at the substantially vertical position;
    a second tilt table comprising:
        a main frame;
        a movable frame pivotally connected to the main frame of the second tilt table, the movable frame of the second tilt table being movable between a horizontally position and a substantially vertical position of less than 90 degrees with reference to the horizontal;
        a glass supporting assembly located on an upper side of movable frame of the second tilt table;
        a tilt mechanism connected between the main frame and the movable frame of the second tilt table;
        a conveyor unit connected to the movable frame of the second tilt table, the conveyor unit of the second tilt table being configured and disposed to move a selected glass offcut when the movable frame of the second tilt table is at the substantially vertical position;
    a storage rack positioned between the first tilt table and the second tilt table, the storage rack comprising:
        a main frame;
        a plurality of slot dividers defining a plurality of parallel storage slots extending longitudinally within the main frame of the storage rack, the storage slots individually storing the glass offcuts at a substantially vertical position of less than 90 degrees with reference to the horizontal;
        a conveyor unit located under the main frame, the conveyor unit being configured and disposed to move a selected glass offcut in and out of the storage rack; and
        a carriage unit located under the main frame, the carriage unit being configured and disposed to transversally displace the main frame of the storage rack with reference to the first and second tilt tables; and
    means for controlling operations of the first tilt table, the storage rack and the second tilt table;
    whereby, in use, the first tilt table receives a selected glass offcut from the breakout table and sends it to the storage rack, and whereby, in use, the second tilt table receives a previously-stored glass offcut from the storage rack to be directed to the loading table.

2. The storage system according to claim 1, further comprising an intermediary conveyor positioned between the first tilt table and the storage rack.

3. The storage system according to claim 1, wherein the substantially vertical position of the movable frame of the first tilt table, the substantially vertical position of the glass offcuts in the storage slots and the substantially vertical position of the movable frame of the second tilt table are each defining an angle between 85° and 88° with reference to the horizontal.

4. The storage system according to claim 1, wherein the glass supporting assembly of the movable frame of the first tilt table and the glass supporting assembly of the movable frame of the second tilt table comprise a plurality of caster wheels distributed over the upper side.

5. The storage system according to claim 1, wherein the second tilt table comprises at least two transversal horizontal conveyors configured and disposed to support a selected glass offcut above the movable frame thereof, when at the horizontal position, and convey it transversallly to the loading table.

6. The storage system according to claim 1, wherein the conveyor unit of the storage rack comprises:
    a vertically-movable conveyor frame extending parallel with reference to the storage slots and located under the main frame of the storage rack;

a plurality of pulleys mounted on the conveyor frame;

a conveyor belt supported by the pulleys;

a motor mechanically connected to the conveyor belt; and an actuator configured and disposed to selectively move the conveyor frame between a raised position and a lower position.

7. The storage system according to claim 6, wherein the pulleys of the conveyor unit of the storage rack are configured and disposed to shape the conveyor belt in a zigzag pattern, whereby, in use, an upper portion of the conveyor belt can be raised between lower beam members of the main frame of the storage rack.

8. The storage system according to claim 1, wherein each storage slot has a bottom supporting area being lower than an upper portion of the conveyor unit of the first tilt table when the movable frame of the first tilt table is at the substantially vertical position.

9. The storage system according to claim 8, wherein protector members are provided at the bottom supporting areas of the slots.

* * * * *